United States Patent
Scheppegrell et al.

(10) Patent No.: US 9,598,025 B1
(45) Date of Patent: Mar. 21, 2017

(54) CAR SEAT ASSEMBLY

(71) Applicant: REVOLUTIONARY CONCEPTS, INC., Matthews, NC (US)

(72) Inventors: Chris Scheppegrell, Charlotte, NC (US); Ronald Carter, Matthews, NC (US); Daniel Lee Bizzell, Charlotte, NC (US)

(73) Assignee: IQmagine, Charlotte, NC (US)

( * ) Notice: Subject to any disclaimer, the term of this patent is extended or adjusted under 35 U.S.C. 154(b) by 0 days.

(21) Appl. No.: 13/835,777

(22) Filed: Mar. 15, 2013

Related U.S. Application Data

(60) Provisional application No. 61/759,716, filed on Feb. 1, 2013.

(51) Int. Cl.
| | |
|---|---|
| *B60R 11/02* | (2006.01) |
| *B60N 3/10* | (2006.01) |
| *B60R 11/00* | (2006.01) |

(52) U.S. Cl.
CPC .......... *B60R 11/0229* (2013.01); *B60N 3/10* (2013.01); *B60N 3/101* (2013.01); *B60R 11/02* (2013.01); *B60R 2011/0014* (2013.01)

(58) Field of Classification Search
None
See application file for complete search history.

(56) References Cited

U.S. PATENT DOCUMENTS

| | | | |
|---|---|---|---|
| 4,979,777 A | 12/1990 | Takada | |
| 5,179,447 A | 1/1993 | Lain | |
| 5,464,381 A | 11/1995 | Wilson | |
| 5,482,352 A | 1/1996 | Leal et al. | |
| 5,624,156 A | 4/1997 | Leal et al. | |
| 6,746,065 B1 | 6/2004 | Chan | |
| 6,792,339 B2 | 9/2004 | Basson et al. | |
| 6,854,744 B2 | 2/2005 | Brandler | |
| 6,871,356 B2 | 3/2005 | Chang | |
| 7,039,207 B1 | 5/2006 | Elrod et al. | |
| 7,077,405 B2 | 7/2006 | Akpom | |

(Continued)

FOREIGN PATENT DOCUMENTS

| | | |
|---|---|---|
| WO | 03-061476 | 7/2003 |

OTHER PUBLICATIONS

Information Disclosure Statement (IDS) Letter Regarding Common Patent Application(s), dated Jun. 3, 2014.

*Primary Examiner* — David E Allred
(74) *Attorney, Agent, or Firm* — Kirby B. Drake; Klemchuk LLP

(57) ABSTRACT

A child's seat assembly includes components enabling mental stimulation, entertainment and comfort for a child or infant while they are sitting in a car seat assembly. A car seat assembly includes a car seat, a cup-holder and an interchangeable cup-holder control enabling access to media, educational tools and two-way, person-to-person communication. A car seat assembly includes a car seat, safety straps for securing occupant in the seat, handle, a canopy to block sunlight or receive a projection, car seat mounting base, crush barrier and a projector. A car seat assembly includes a removable handle pad for holding a smart phone. A removable handle pad for holding for holding a smart phone includes a pad and a smart phone pouch on the surface of the pad. The car seat assembly of the invention is intended for use with an infant or toddler.

3 Claims, 26 Drawing Sheets

(56) References Cited

U.S. PATENT DOCUMENTS

| | | | |
|---|---|---|---|
| 7,084,859 B1 | 8/2006 | Pryor | |
| 7,201,444 B2 | 4/2007 | Schimmoller et al. | |
| 7,378,974 B1 | 5/2008 | Bassett et al. | |
| 7,448,675 B1 * | 11/2008 | Lowery | A47C 20/023 297/188.14 |
| 8,007,043 B1 * | 8/2011 | Vuong | B60N 2/28 297/217.3 |
| 8,016,676 B2 * | 9/2011 | Carter | B60N 2/2839 297/219.12 |
| 8,777,311 B1 * | 7/2014 | Laurel, Jr. | A47D 1/00 297/217.3 |
| 8,934,226 B2 * | 1/2015 | Smith | G06F 1/1613 361/679.2 |
| 2002/0145512 A1 * | 10/2002 | Sleichter, III | G08B 21/06 340/407.1 |
| 2002/0161501 A1 | 10/2002 | Dulin et al. | |
| 2003/0220145 A1 | 11/2003 | Erickson et al. | |
| 2004/0008255 A1 | 1/2004 | Lewellen | |
| 2004/0097288 A1 | 5/2004 | Sloate et al. | |
| 2004/0242333 A1 | 12/2004 | Arakawa et al. | |
| 2004/0259070 A1 | 12/2004 | Goodstein | |
| 2005/0067865 A1 | 3/2005 | Yu | |
| 2005/0151401 A1 | 7/2005 | Evans | |
| 2005/0234373 A1 * | 10/2005 | Khalaf | A61H 23/0263 601/71 |
| 2006/0001300 A1 | 1/2006 | Harcourt et al. | |
| 2006/0113342 A1 | 6/2006 | Hampton et al. | |
| 2007/0176469 A1 | 8/2007 | Day | |
| 2007/0247800 A1 | 10/2007 | Smith et al. | |
| 2008/0080076 A1 | 4/2008 | Hutzel et al. | |
| 2009/0006336 A1 | 1/2009 | Forstall et al. | |
| 2009/0079557 A1 | 3/2009 | Miner | |
| 2009/0203956 A1 * | 8/2009 | Nour | A61H 9/0078 600/16 |
| 2010/0333146 A1 * | 12/2010 | Pickney | B60R 11/0235 725/75 |
| 2011/0169308 A1 * | 7/2011 | Carter | B60N 2/28 297/217.3 |
| 2013/0257620 A1 * | 10/2013 | Tsou | A61B 5/18 340/573.1 |

\* cited by examiner

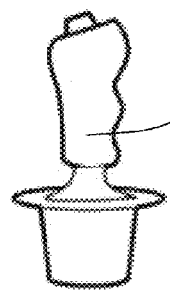
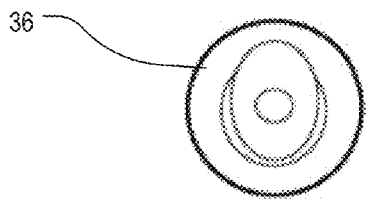
Joystick
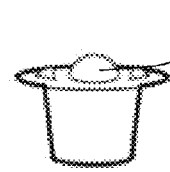
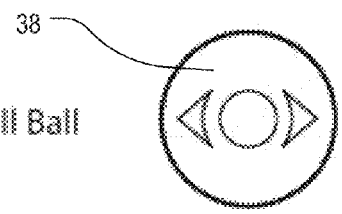
Buttons and Scroll Ball
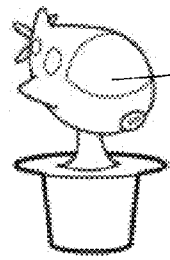
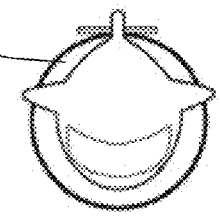
Character
(Octonauts Submarine)
*FIG. 4*

2000

502

CAR SEAT ASSEMBLY

CROSS-REFERENCE TO RELATED APPLICATION

The present application is a U.S. nonprovisional patent application of, and claims priority under 35 U.S.C. §119(e) to, U.S. provisional patent application Ser. No. 61/759,716, filed Feb. 1, 2013; which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

This invention relates generally to a system for entertaining a child or infant while in a car seat assembly, such as an assembly that can mentally stimulate, entertain, distract and comfort an infant or child sitting in a car seat assembly.

Background

Children and infants spend a great deal of time being driven around in a vehicle. Laws mandate that children and infants use safety seats in vehicles. As a result of safety seat laws, children spend a great deal of time in a safety seats. Further, it may be convenient to manually transport the infant or small child from one location to another location in a safety seat. Because of the frequency of use, parents, children, and infants appreciate a safety seat assembly in which the children or infants are mentally stimulated, entertained, distracted and otherwise comforted while in a car seat assembly.

Accordingly, a need exists for an improved car seat assembly that mentally stimulates, entertains, distracts, and comforts a child or infant while they are sitting in a car seat assembly. These, and other needs, are addressed by one or more aspects of the present invention.

SUMMARY OF THE PRESENT INVENTION

The present invention includes many aspects and features. Moreover, while many aspects and features of the invention relate to, and are described in, the context of a seat assembly for installation and use in a vehicle (hereinafter "car seat assembly"), the invention is not limited to use only in such context and may be used and has applicability in other contexts as well. For example, it will be appreciated that the invention has further applicability to a seat assembly that is used in the context of a stroller, carrier, or crib.

In one or more aspects, the invention broadly relates to a car seat assembly. Such a car seat assembly may comprise devices including one or more components, wherein each of the one or more widgets are configured for attachment to a car seat and the car seat the device is attached to. In either case the components preferably enable: mental stimulation, entertainment, and comfort for a child or infant while they are sitting in a car seat assembly.

Broadly defined, the present invention according to a first aspect includes a car seat assembly that includes a car seat with a cup-holder, and a controller for wirelessly accessing media, educational tools and communication devices. The controller fits within the cup-holder and can be interchange for alternative controller. The car seat assembly may also include an adjustable arm extending a camera, a touchscreen, a smart phone, or a clip for the attachment of an electronic device.

Broadly defined, the present invention according to a second aspect includes a car seat assembly that includes a car seat with a projector incorporated into the car seat and that enables projection of content, video, and images on a car roof, a canopy, or a projector screen. The projector screen is preferably attached or incorporated into the back of a car seat. In features of this aspect, the projector components include a transceiver or, alternatively, a separate receiver and a separate transmitter wherein the projector may be controlled wirelessly.

Broadly defined, the present invention according to a third aspect includes a car seat assembly that includes a car seat and safety straps with a pulsation system to comfort the occupant seated in the car seat. The pulsation system is intended to provide comfort and calm the occupant seated in the car seat by replicating a heartbeat or vibrating.

Broadly defined, the present invention according to a fourth aspect includes a car seat assembly with safety straps and a seat sensor that enables the detection of an occupant seated in the car seat assembly. In variation of this feature, the seat sensor may be built into the base or back of the car seat assembly. In a further feature of this aspect, the sensor may be built into the safety straps of the car assembly. The sensor may use used to show or relay the status of the occupant in the seat or the status of the seat assembly.

Broadly defined, the present invention according to a fifth aspect includes a car seat assembly with a car seat and a mounting base. The seat assembly is securely docked on the mounting base of the car seat assembly. In this respect, and in accordance with a further feature, the mounting base includes a footrest that folds out from the front wall of the mounting base. In a further feature, the height of the footrest in the folded out state is adjustable. Conversely, the footrest may be folded up to form the front wall of the mounting base. In a further feature, the mounting base includes a storage area located directly under the car seat. Access to the storage area is preferably located on at least one of the side walls of the mounting base. The opening to the storage area may be covered with a barrier net to retain stored items. The barrier net may be stretched or removed to insert items into the storage area.

Broadly defined, the present invention according to a sixth aspect includes a car seat assembly with a car seat and a crush barrier to prevent crushing an occupant located in the seat assembly. The crush barriers extend along the sides of the car seat. In the features of this aspect, the crush barrier may also be shaped so as to include a cup-holder. The cup-hold is capable of receiving an interchangeable controller for wirelessly accessing media, educational tools and communication devices.

Broadly defined, the present invention according to a seventh aspect includes a car seat assembly with a car seat, a canopy, and a projector incorporated into the car seat to enable the projection of content, video, and images. The projector components include a transceiver or, alternatively, a separate receiver and a separate transmitter wherein the projector may be controlled wirelessly. The canopy attaches to either side of the car seat assembly and can extend to block sunlight or receive a projection. In a further preferred feature, the canopy is made of a translucent mylar material.

Broadly defined, the present invention according to an eighth aspect includes a car seat assembly with a car seat, safety straps for safety securing occupant in the seat, a handle connected to the seat, a canopy connected to the seat, a car seat mounting base capable for receiving the seat, and a projector. The safety straps include a pulsation system to comfort the occupant seated in the car seat. The pulsation system is intended to provide comfort and sooth the occupant seated in the car seat by replicating a heartbeat or vibrating. In the preferred embodiment, the handle has a dual handle push lock system. The handle adjustment is achieved by simultaneously pushing and holding down the push locks. In features of this aspect, the handle extends over the canopy so that the handle may be selectively placed without interfering with the positioning of the canopy. The canopy attaches to either side of the car seat assembly and can extend to block sunlight or receive a projection. In features of the aspect, the canopy can be portionally separated so that a part of the canopy is extended or positioned to block sunlight or receive a projection. A retracted canopy permits the projector to project content, video, and images upon the car roof or upon a protector screen. In a further feature of this aspect, the car seat mounting base includes a level tune knob to selectively tilt the car seat while docked on the mounting base. In features of this aspect, the level tune knob is mounted on the front of the base so the seat may be tilted without removing the car seat assembly from the car.

Broadly defined, the present invention according to a ninth aspect includes a car seat assembly substantially as shown and described.

Broadly defined, the present invention according to a tenth aspect includes a car seat assembly for mental stimulation, entertainment, and comfort of a child or infant while they are sitting in a car seat assembly.

Broadly defined, the present invention according to an eleventh aspect includes a removable handle pad with a smart phone pouch and a pad that is capable of attaching to a car seat assembly. In features of this aspect, the pouch is a see through poly material that has one opened end for insertion of a smart phone into the pouch. The pouch includes speaker holes so that the occupant of the car seat assembly or another person may use the phone while it is in the pouch. In the preferred embodiment, pouch is attached to a foam pad surrounded by fabric capable of being wrapped around the handle of the car seat assembly. The removable handle pad may be formed from two or three foam pads. The removable handle pad, may have Velcro on either ends of the pad to secure the removable handle pad to the handle of the car seat assembly. In this respect, a secure handle pad may be rotated so that the pouch is on the top side or bottom side of the handle.

Broadly defined, the present invention according to a twelfth aspect includes a handle pad substantially as shown and described.

BRIEF DESCRIPTION OF THE DRAWINGS

Further features, embodiments, and advantages of the present invention will become apparent from the following detailed description with reference to the drawings, wherein:

FIG. 4 provides side and top views of alternative controls for the child car seat assembly of FIGS. 2 and 3;

DETAILED DESCRIPTION

Figure 1:
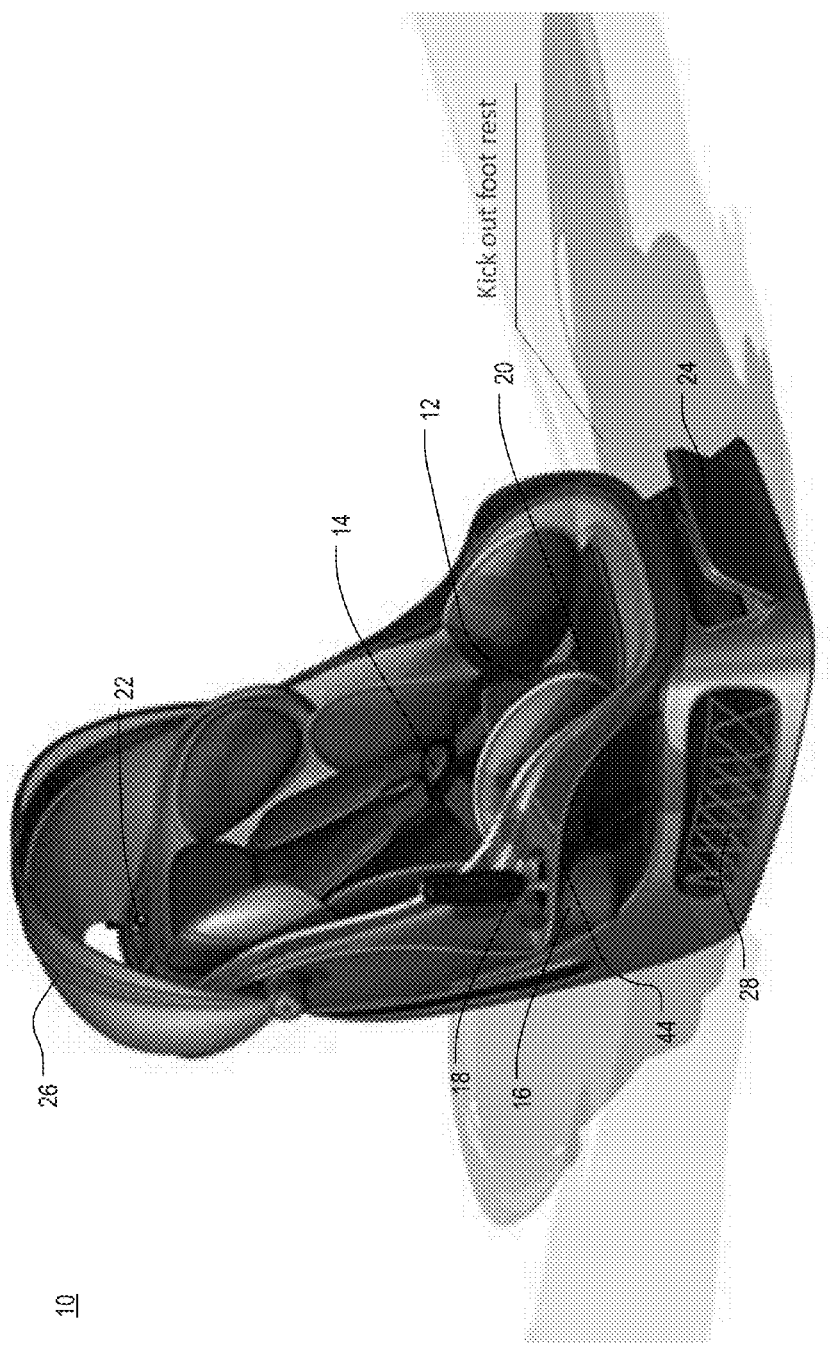
FIG. 1 is a perspective view of a child car seat assembly in accordance with one or more embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

FIG. 1 is a perspective view of a child car seat assembly 10 in accordance with one or more embodiments of the present invention. As shown in FIG. 1, the car seat assembly 10 includes a child's car seat 12, safety straps 14, cup-holder 16, interchangeable controller 18, seat sensor 20, projector 22, footrest 24, canopy 26, storage area 28, crush barrier 44 and entertainment components. Interchangeable controller 18 fits within cup-holder 16 and is configured to be utilized to wirelessly play video games play, access educational tools, watch various entertainment media such as movies and videos, access available internet content, control projector 22, and enable two-way wireless communication between the occupant of the car seat assembly 10 and another person or device. In at least one embodiment, the entertainment components also include an adjustable arm 30 extending a camera 32 from seat assembly 10 or seat assembly 1000 (see FIGS. 2 and 3). Camera 32 may be integrated with technology for wirelessly accessing various entertainment and educational media, enabling two-way communication and monitoring the occupant of car seat assembly. In one contemplated embodiment, a touch-screen, smart phone or another communication device is extended from adjustable arm 30 allowing for monitoring of the child with a smart phone. Further, in another contemplated embodiment, the adjustable arm 30 includes a clip for attachment of a touch-screen, smart phone or another communication device.

Figure 2:
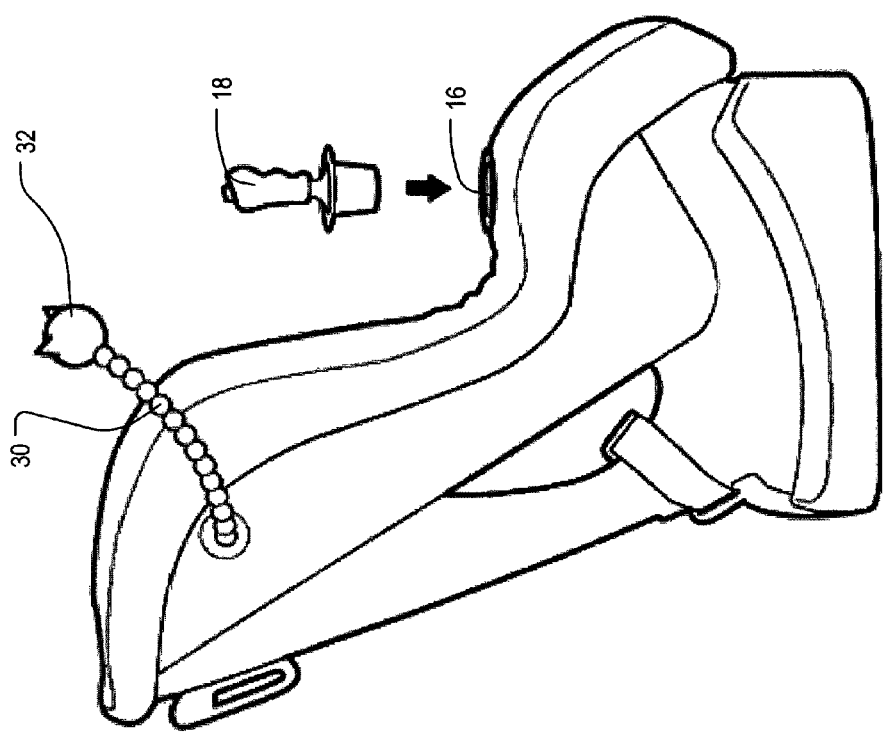
FIGS. 2 and 3 are side views of a child car seat assembly with a cup-holder controller in accordance with a preferred embodiment of the present invention.
Figure 3:
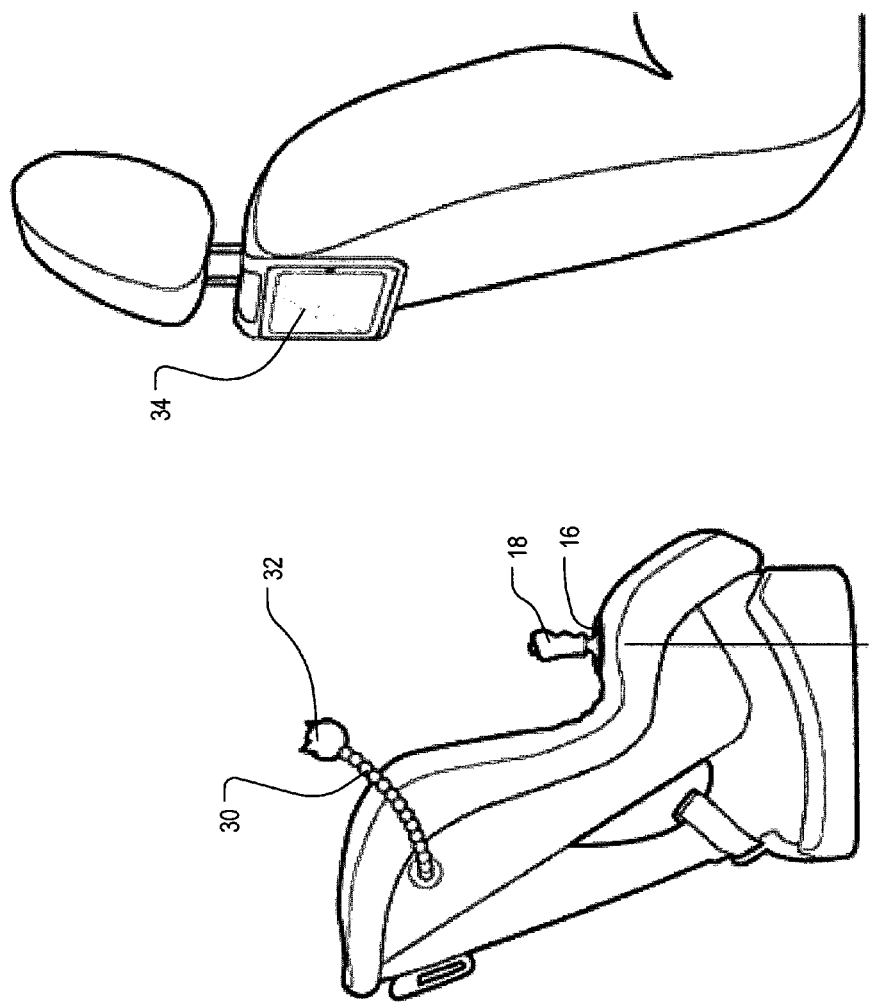

FIGS. 2 and 3 are side views of a child car seat assembly 1000 in accordance with one or more embodiments of the present invention. As can be seen in FIG. 2, the cup-holder 16 fits interchangeable controller 18. Controller 18 can be removed and switched out by lifting controller 18 from cup-holder 16. An alternate controller may be used in cup-holder 16 (see FIG. 4). In one contemplated embodiment, the cup-holder 16 fits a clip for a smart phone or another communication device. In another contemplated embodiment, the cup-holder fits a mount for a touch-screen. In a preferred embodiment, controller 18 may be used to control a tablet 34 mounted on a car headrest (see FIG. 3). In one contemplated embodiment, the controller 18 may be used to wirelessly play video games, access educational tools, watch various entertainment media such as movies and videos, access available be content, and enable two-way wireless communication between the occupant of the car seat assembly 1000 and another person or device.

FIG. 4 shows side views and top views of alternate controllers that may be interchanged with controller 18 and fit cup-holder 16. As shown in FIG. 4, the controller 18 may comprise a joystick 36, a button and scroll ball 38 or a character 40.

Figure 5:
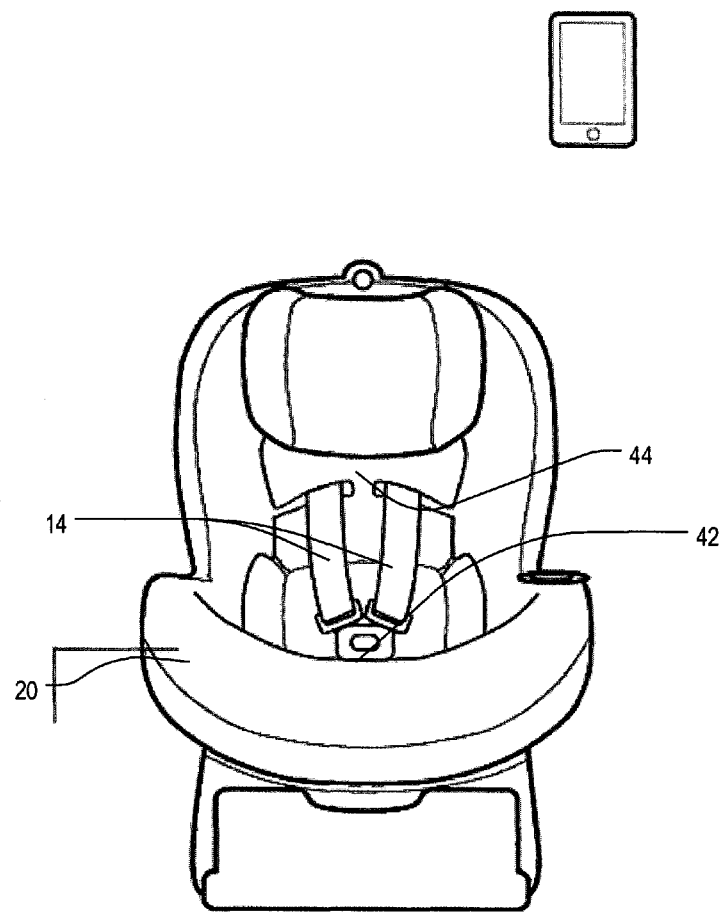
FIG. 5 is a front view of a child car seat assembly in accordance with one or more embodiments of the present invention which includes a built in seat sensor in accordance with a preferred embodiment of the present invention.

FIG. 5 is a front view of the child car seat assembly 1000 in accordance with one or more embodiments of the present invention. As shown in FIG. 5, the child car seat assembly 1000 includes a built in seat sensor 20. The seat sensor 20 may be used to detect the presence of a child in the car seat assembly 1000. Specifically, seat sensor 20 has been built into the seat-base 42 of the child's car seat assembly 1000 and communicates to another person or device that the occupant of the car seat assembly 1000 has been left behind. In other contemplated embodiments, the seat sensor is built into the back of the seat 44 or into safety straps 14 of the car seat assembly 1000. Further, in one contemplated embodiment, seat sensor 20 may be used to show a status of seat assembly 1000. Specifically, seat sensor communicates to another person or device that the car seat assembly 1000 is properly secured and installed in the vehicle.

Figure 6:
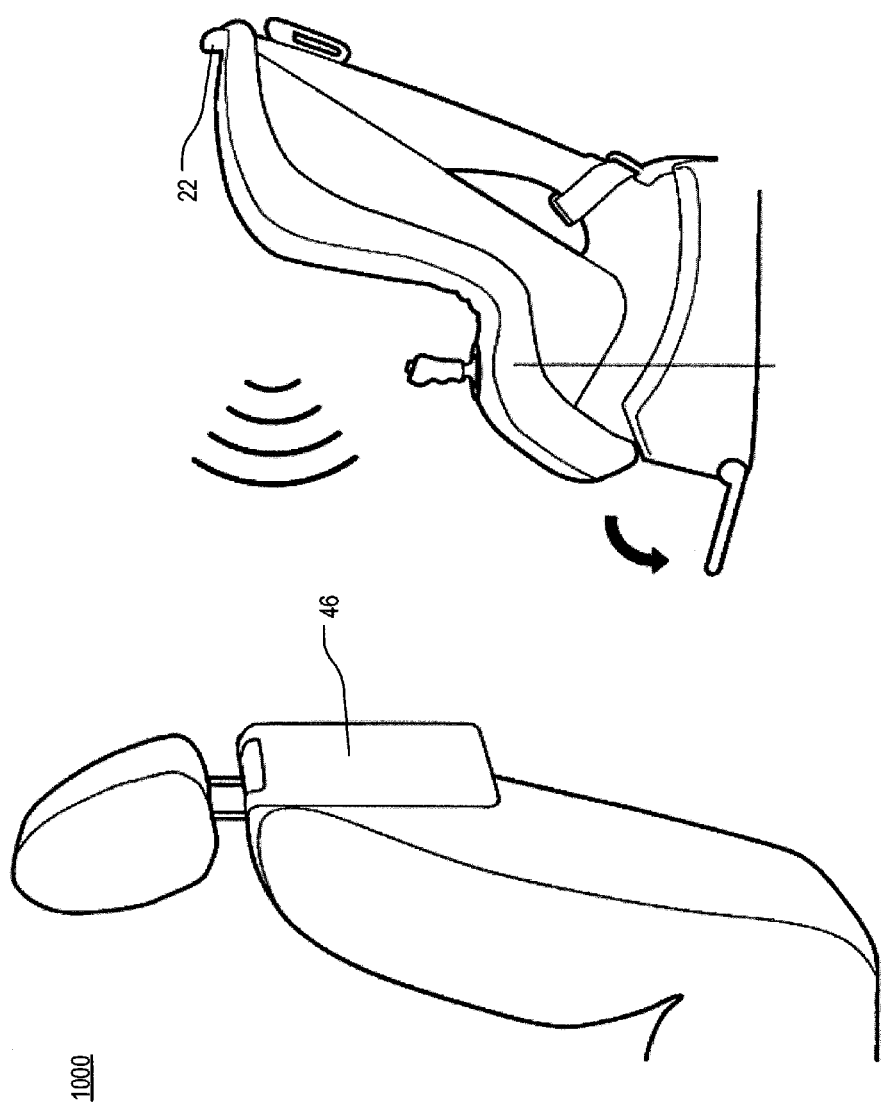
FIG. 6 is a side view of a child car seat assembly which includes a projector in accordance with a preferred embodiment of the present invention.

FIG. 6 is a side view of the child car seat assembly 1000 in accordance with one or more embodiments of the present invention. As shown in FIG. 6, the child car seat assembly 1000 includes a projector 22. Projector 22 may be activated, deactivated, and controlled by a tablet or smart-phone. In at least some embodiments, the projector 22 is configured to project content, video, and images upon a projector screen 46 fastened to the back of the front seat. In at least some embodiments, the projector 22 is configured to project content, video, and images upon the car roof liner or canopy 26 extending from the seat assembly 1000 (as best seen in FIG. 8).

Figure 7:
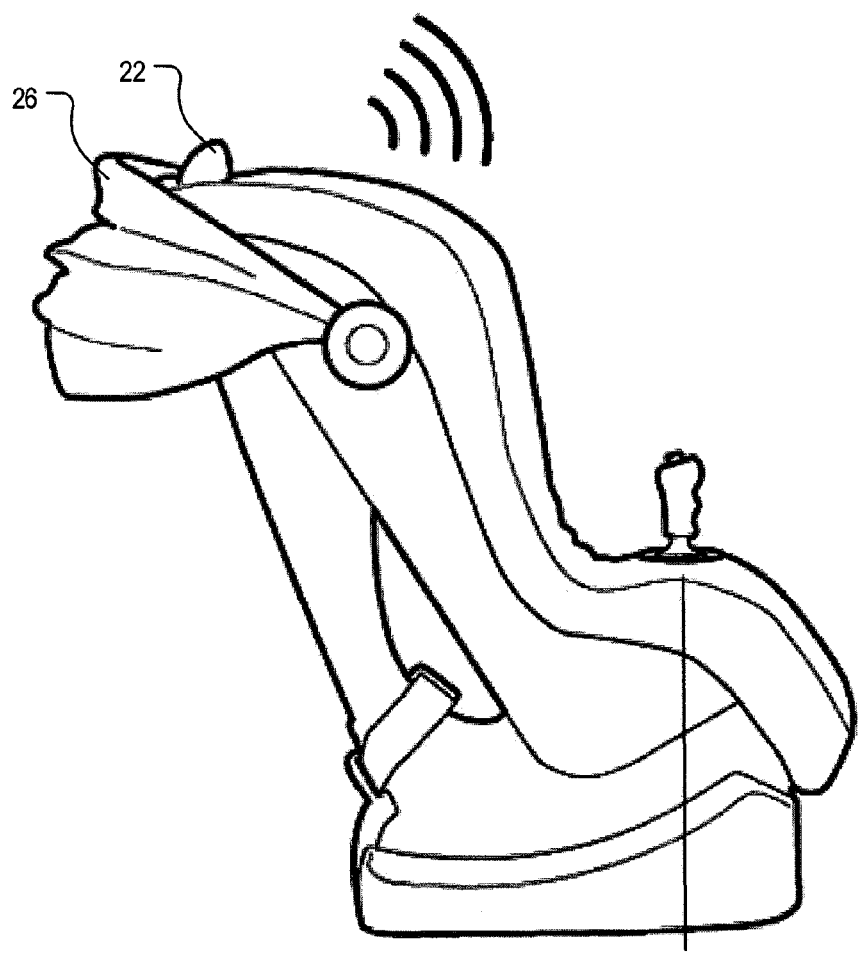
FIGS. 7 and 8 are side view of a child car seat assembly having a canopy in accordance with a preferred embodiment of the present invention.
Figure 8:
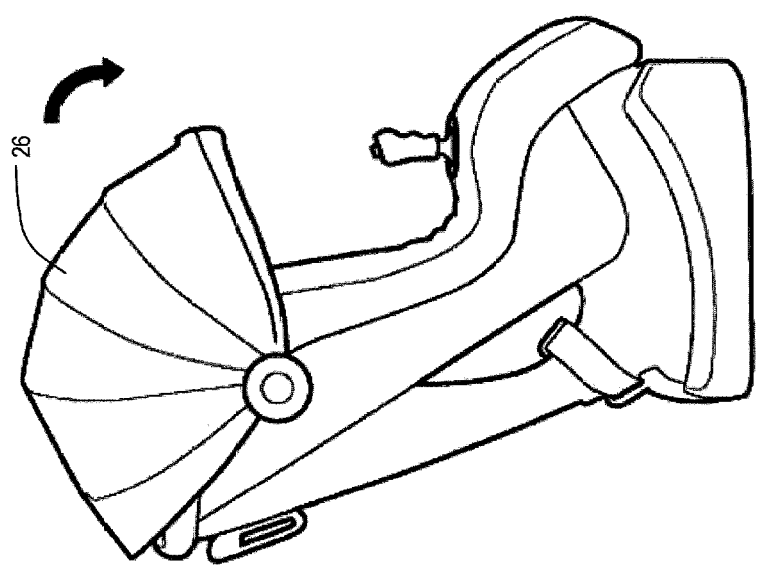

FIGS. 7 and 8 are side views of the child car seat assembly 1000 in accordance with one or more embodiments of the present invention. As shown in FIGS. 7 and 8, the child car seat assembly 1000 includes a canopy 26. In the preferred embodiment, the canopy 26 attaches to either side of the car seat assembly 1000. As shown in FIG. 7, canopy 26 retracts allowing projector 22 to project upon car roof liner. As shown in FIG. 8, canopy 26 extends to block sunlight or allow projector 22 to project upon canopy 26. In the preferred embodiment, canopy 26 is fully adjustable and tiltable in its arrangement with car seat assembly 1000. Further, in one contemplated embodiment, canopy 42 is made of a translucent mylar material.

Figure 9:
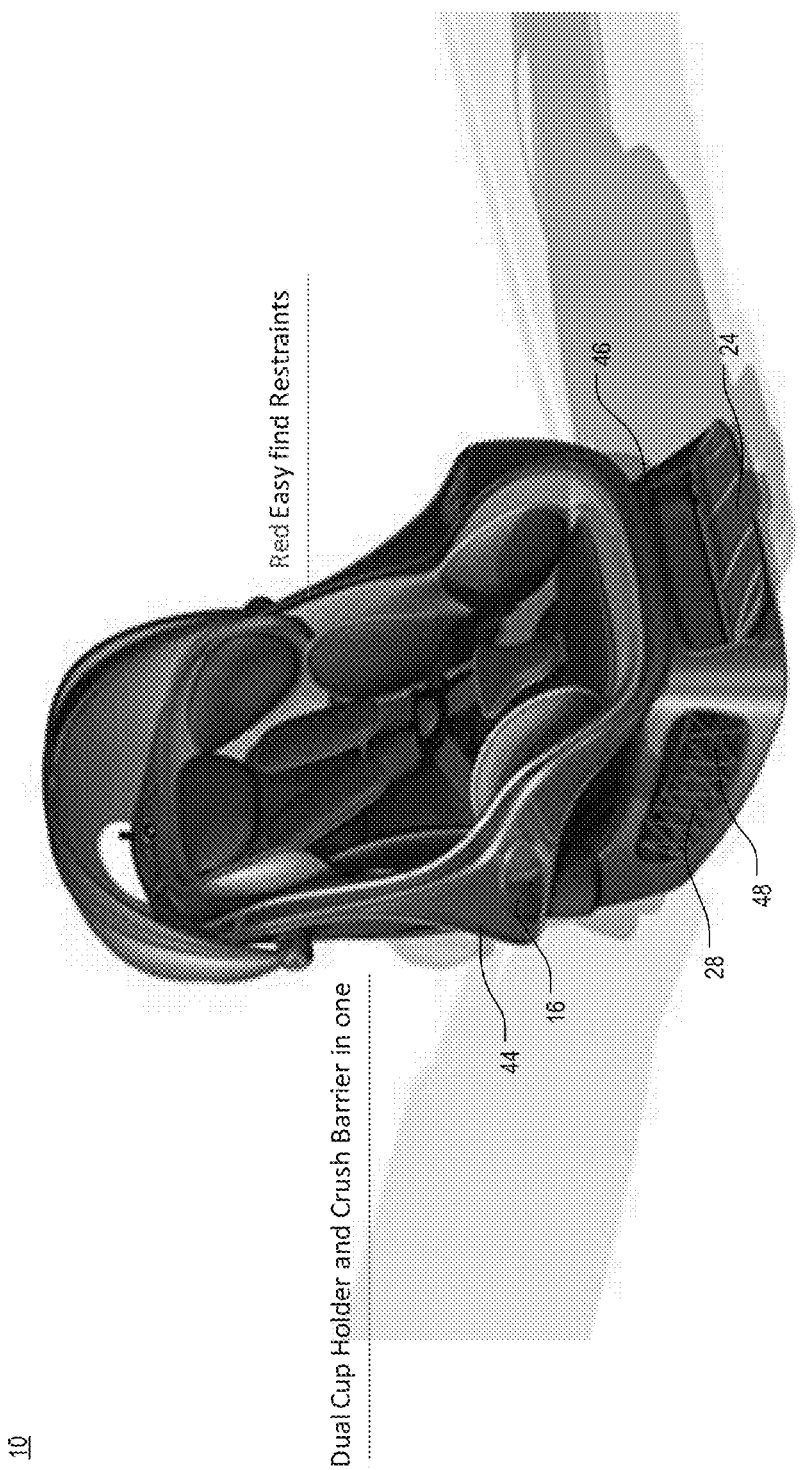
FIG. 9 is a perspective view of a child car seat assembly having a foot rest, storage area and crush barrier in accordance with a preferred embodiment of the present invention.

FIG. 9 is a perspective view of the child car seat assembly 10 in accordance with one or more embodiments of the present invention. As shown in FIG. 9, the child car seat assembly 10 includes a footrest 24, storage area 28, and crush barrier 44. Footrest 24 may be folded up to form the front wall of the car seat assembly 10 base 46. Access to the storage area 28 is located on the side walls of the car seat assembly 10 base 46. The storage area 28 has a barrier net 48 to retain stored items. Further, FIG. 9 of the car seat assembly 10 may includes a crush barrier 44. Crush barrier 44 extends along the right and left sides of the car seat assembly 10. In one contemplated embodiment, cup-holder 16 is situated within crush barrier 44.

Figure 10:
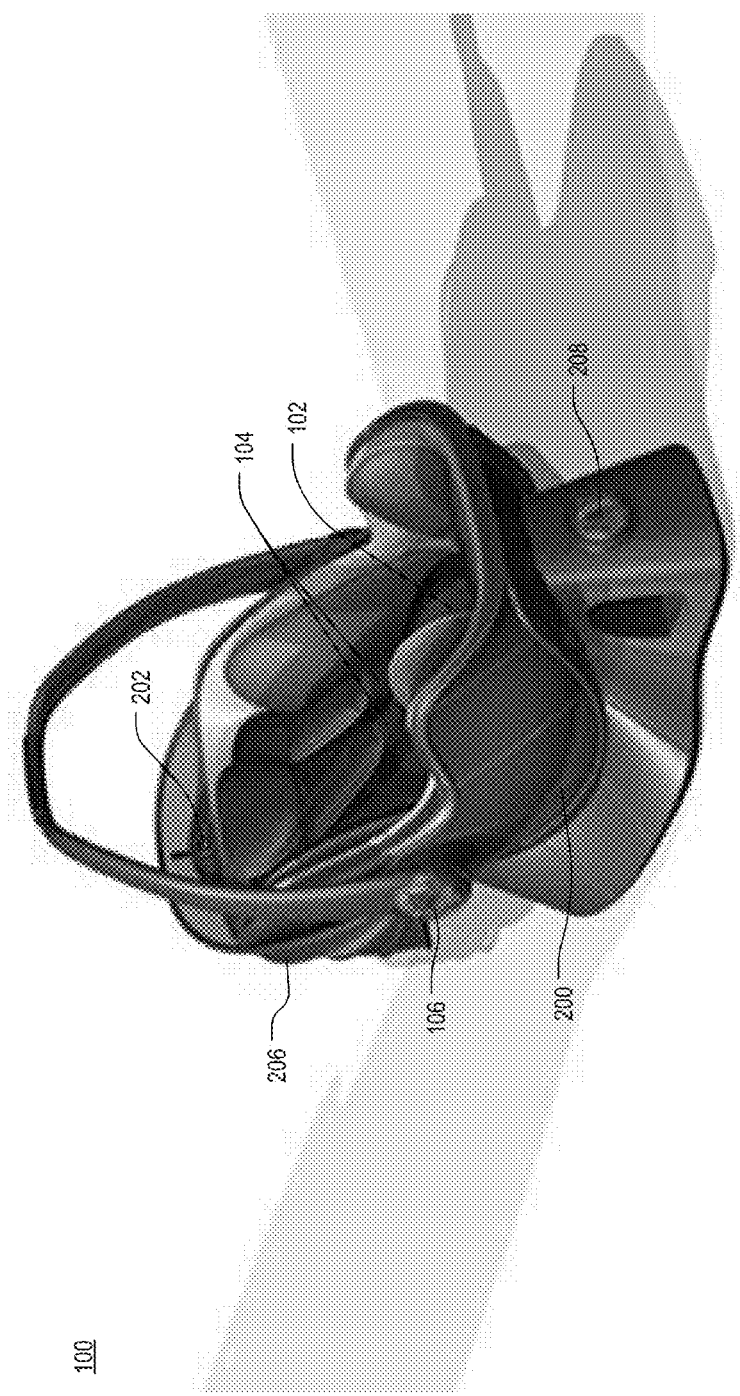
FIG. 10 is a perspective view of an infant car seat assembly in accordance with one or more embodiments of the present invention.
Figure 11:
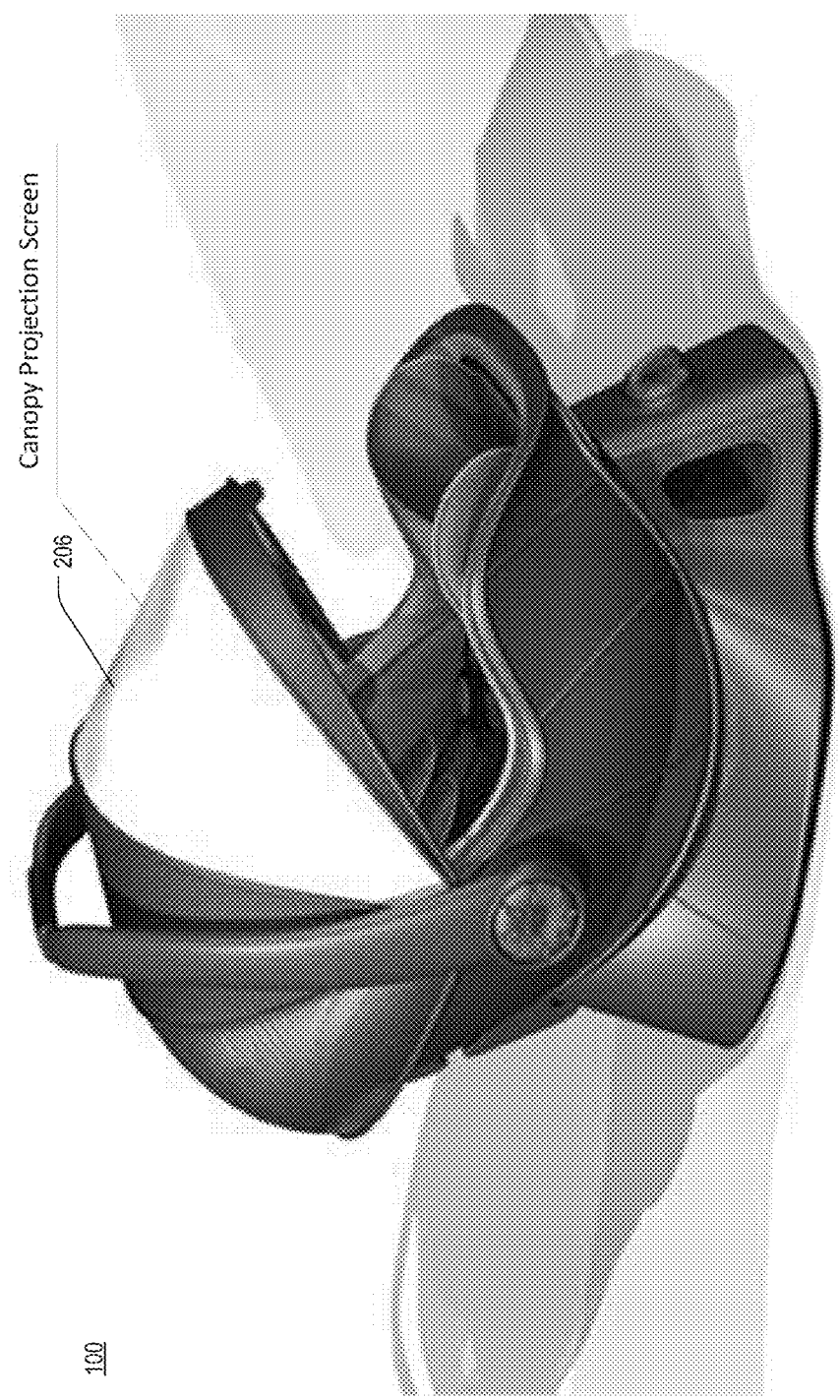
FIG. 11 is a side perspective view of the infant car seat assembly of FIG. 10 with an extended translucent canopy for projection or to block the sun in accordance with a preferred embodiment of the present invention.
Figure 16:
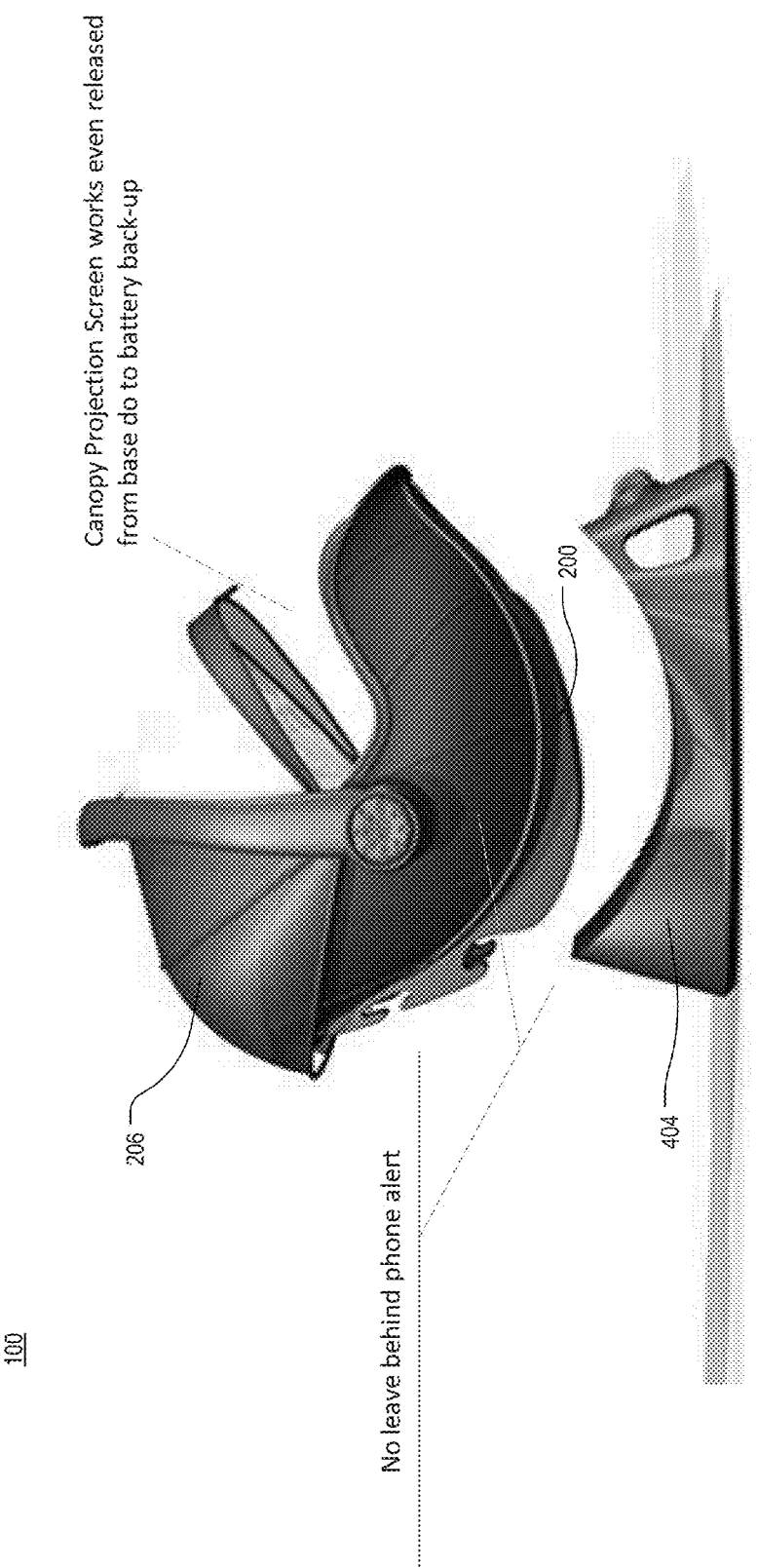
FIG. 16 is a side view of the infant car seat assembly of FIG. 10 detached from its docking-base member with its canopy extended and a seat sensor in accordance with a preferred embodiment of the present invention.

FIG. 10 is a perspective illustration of an infant car seat assembly 100 in accordance with one or more embodiments of the present invention. As shown in FIG. 10, the car seat assembly 100 includes an infant's car seat 102, safety straps 104, handle push lock 106, seat sensor 200, canopy 206, level knob 208, and projector 202. Projector 202 may be activated, deactivated, and controlled by a tablet or smart-phone. In a preferred embodiment, the projector 202 projects content, video, and images upon canopy 206 (as best seen in FIGS. 11 and 16). In at least some embodiments of the present invention, the projector 202 projects content, video, and images upon the car roof liner (as best seen in FIG. 12).

FIG. 11 is a side view of the infant car seat assembly 100 of FIG. 10 with canopy 206 extended for projection or to block the sun in accordance with one or more embodiments of the present invention. In the preferred embodiment, the canopy 206 attaches to either side of the car seat assembly 100. As shown in FIG. 11, canopy 206 is fully adjustable and tiltable in its arrangement with car seat assembly 100.

Figure 12:
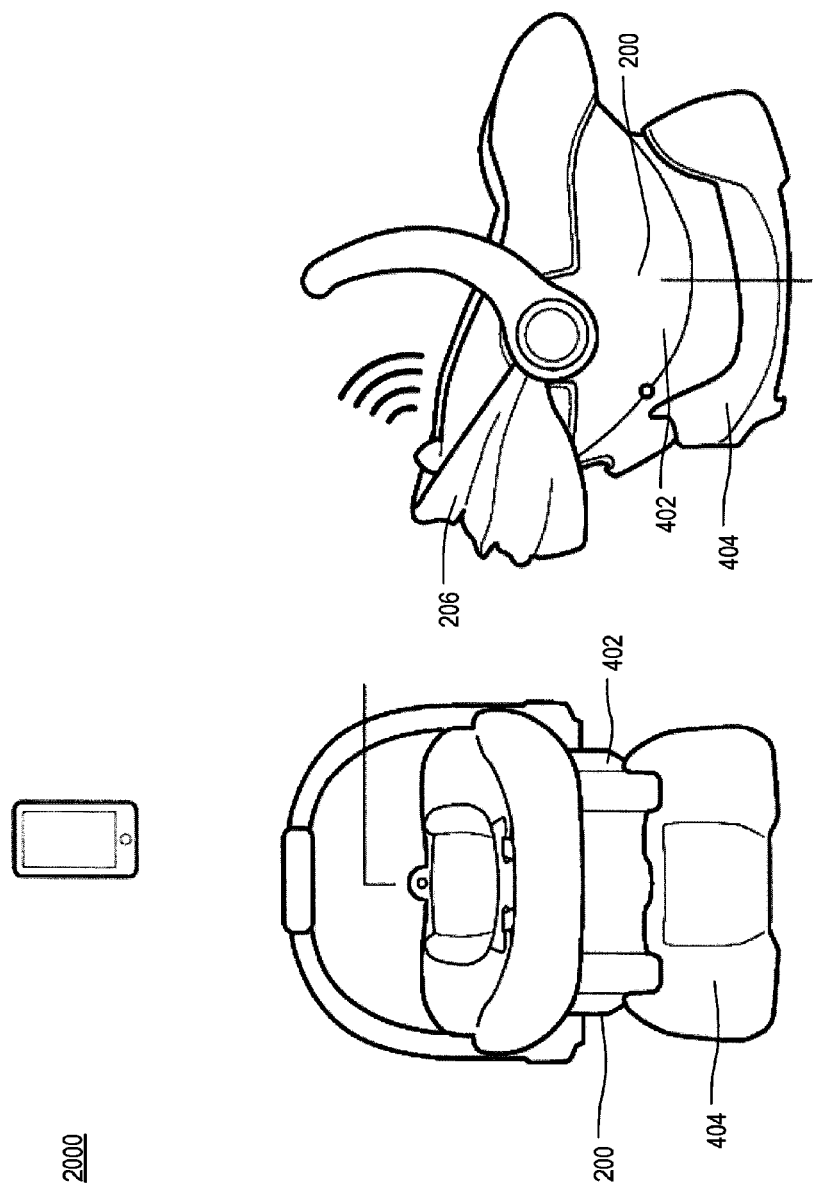
FIG. 12 provides front and side views of an infant seat assembly which includes a built in seat sensor, a projector on top of the seat controlled by a tablet or smart-phone and a canopy in accordance with one or more embodiments of the present invention.

FIG. 12 is a front and side view of the infant seat assembly 2000 in accordance with one or more embodiments of the present invention. As shown in FIG. 12, the child car seat assembly 2000 includes a built in seat sensor 200, a projector 202 on the seat assembly 2000, optionally controlled by a tablet or smart-phone and a canopy 206 in accordance with one or more embodiments of the present invention. As shown in FIG. 12, the canopy 206 is in the retracted position to allow for projector 202 to project images upon a projector screen or on the car roof liner. In a preferred embodiment, the seat sensor 200 may be used to detect the presence of an infant in the car seat assembly 2000. Specifically, seat sensor 200 has been built into the seat-base 402 of the infant's car seat assembly 2000 and communicates to another person or device that the occupant of the car seat assembly 2000 has been left behind. In one contemplated embodiment, the seat sensor is built into the seat 102. In another contemplated embodiment, the seat sensor is built into docking-base 404. In a further contemplated embodiment, seat sensor 200 may be used to show a status of the seat assembly 2000. Specifically, the state of the seat may specify that the seat is locked-in-place or secure.

Figure 13:
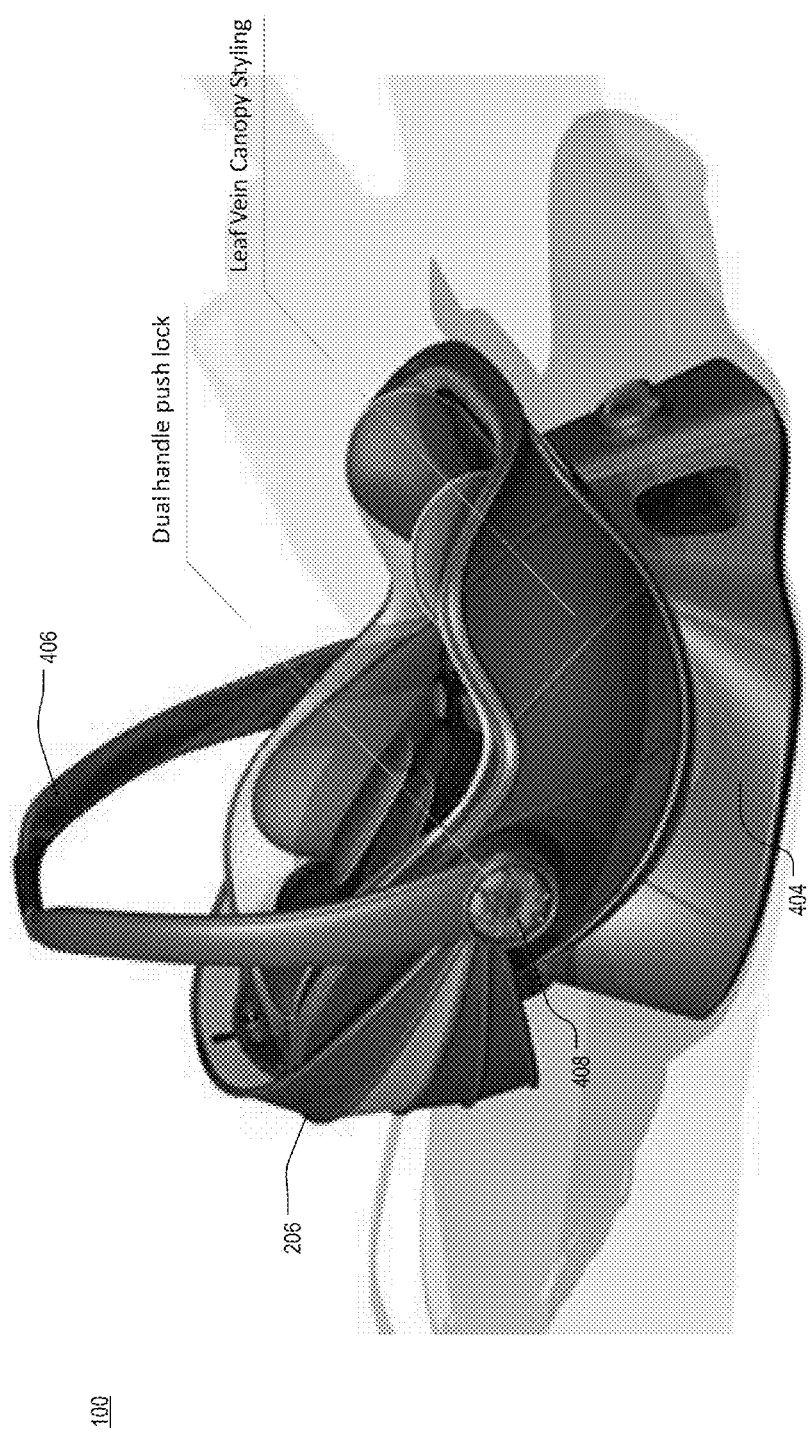
FIG. 13 is a side perspective view of an infant car seat assembly with a dual handle push lock system in accordance with a preferred embodiment of the present invention.

FIG. 13 is a side illustration of the infant car seat assembly of FIG. 10 with a handle 406 and a dual handle push lock system 408 in accordance with a preferred embodiment of the present invention. Handle 406 may be locked into docking-base 404 while in any position to allow for optimal safety of the seat assembly 100 or to allow handle 406 of seat assembly 100 to take up the least amount of space in the vehicle. In a preferred embodiment, handle 406 extends over canopy 206 to allow for selective positioning of handle 406 without interfering with canopy 206. In at least one contemplated embodiment, canopy 206 extends over handle 406. In another contemplated embodiment, canopy 206 and handle 406 are located on the same plane such that handle 406 is separate from or incorporated within canopy 206.

Figure 14:
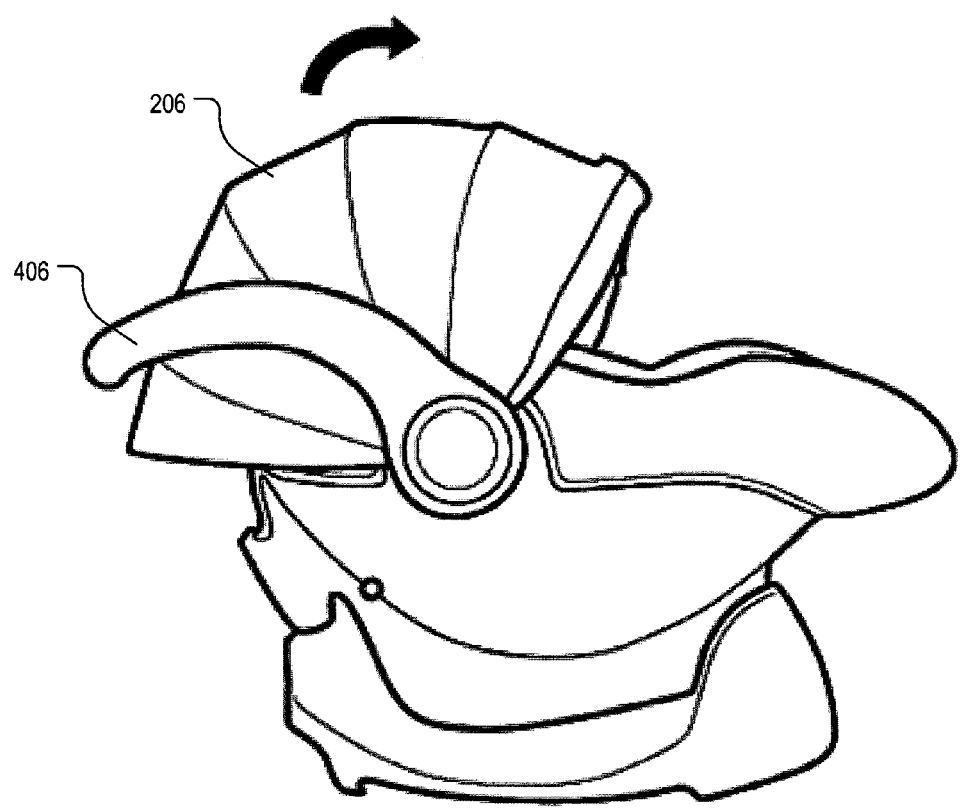
FIG. 14 is a side illustration of an infant car seat assembly with a canopy extended for projection or to block sun in accordance with a preferred embodiment of the present invention.

FIG. 14 is a side view of the infant seat assembly of FIG. 12 with handle 406 in the back position and canopy 206 extended for receiving a projection or to block the sun in accordance with a preferred embodiment of the present invention. In one contemplated embodiment, canopy 402 is made of a translucent mylar material.

Figure 15:
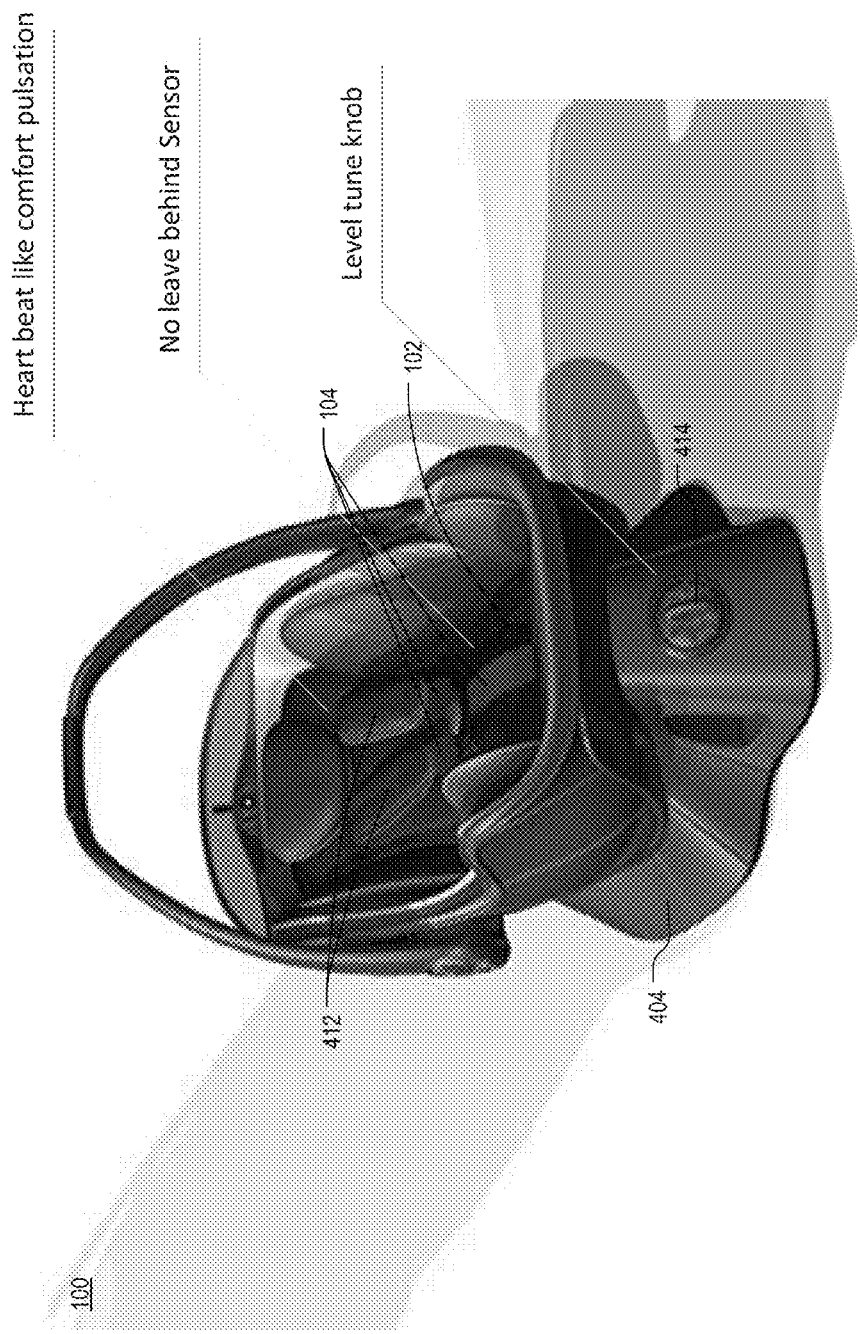
FIG. 15 is a perspective view of the infant seat assembly of FIG. 10 attached to a docking-base member with easy to find safety straps, comfort pulsation system, and a level tune knob in accordance with a preferred embodiment of the present invention.

FIG. 15 is a perspective illustration of the infant seat assembly of FIG. 10 attached to docking-base 404 with easy to find safety straps 104, comfort pulsation system 412, and level tune knob 414 in accordance with a preferred embodiment of the present invention. In the preferred embodiment, level tune knob 414 is located on the docking-base 404. Level tune knob 414 allows for infant's car seat 102 to be tilted at a selected angle while docking-base 404 sits flat against a vehicle seat. In a preferred embodiment, the comfort pulsation system 412 forms the upper strap portion of safety straps 104. In another contemplated embodiment, pulsation system 412 is located elsewhere on the infant seat assembly 100. The pulsation system 412 replicates a heartbeat pulsation to provide comfort to the occupant of the infant seat assembly 100. In a contemplated embodiment, pulsation system 412 vibrates to provide comfort to the occupant of the infant seat assembly 100. In a further contemplated embodiment, pulsation system 412 provides various other calming effects to comfort the occupant of the infant seat assembly 100.

FIG. 16 is a side illustration of the infant car seat assembly of FIG. 10 detached from docking-base 404 with canopy 206 extended and a seat sensor system 200 in accordance with a preferred embodiment of the present invention. Projector 202 may continue to project content, video, and images upon canopy 206 even when released from docking-base member 404.

Figure 17:
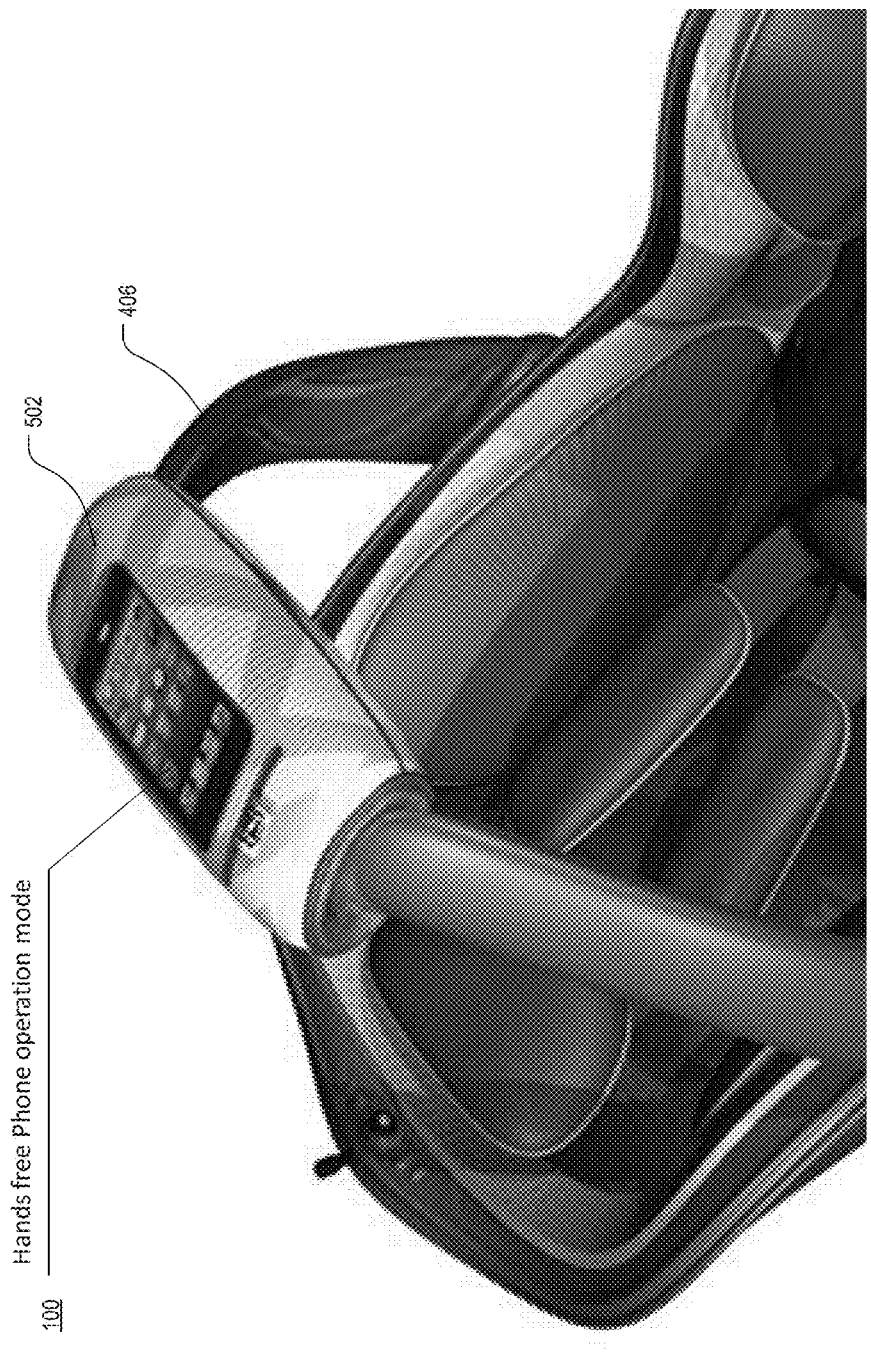
FIG. 17 is a perspective illustration of an infant car seat assembly having a removable handle pad with smart phone pouch secured thereto in accordance with a preferred embodiment of the present invention.

FIG. 17 is a top-perspective illustration of an infant car seat assembly 100 having a removable handle pad 502 with smart phone pouch 504 in accordance with a preferred embodiment of the present invention. The removable handle pad 502 is attached to infant car seat assembly 100 by wrapping handle pad 502 around handle 406 of infant car seat assembly 100. Handle pad 502 may wrap around handle 406 in either direction. A smart phone may be inserted into the handle pad 502 when the handle pad 502 is attached or disconnected from infant car seat assembly 100.

Figure 18:
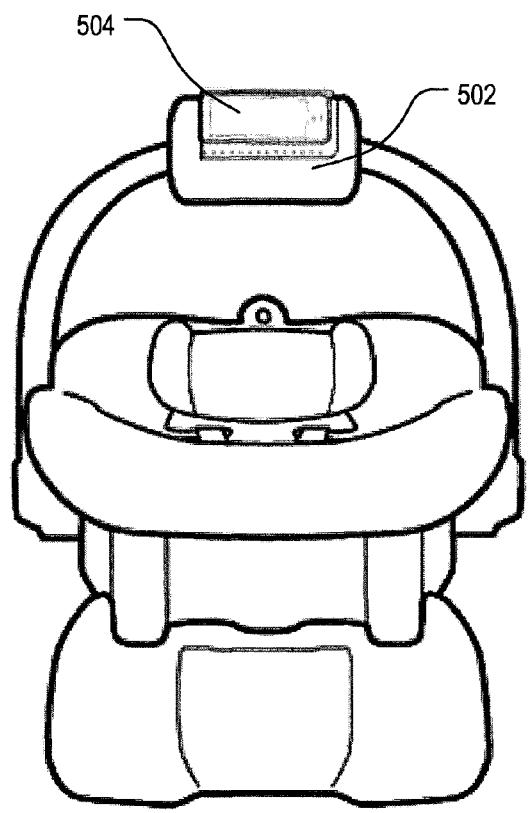
FIG. 18 is a front view of an infant car seat assembly having a removable handle pad secured thereto.

FIG. 18 is a front view of the infant car seat assembly 2000 having a removable handle pad 502 with smart phone pouch 504 in accordance with a preferred embodiment of the present invention. In a preferred embodiment, the smart phone pouch 504 is facing upward to allow a carrier of the infant car seat assembly 2000 to use a smart phone contained in smart phone pouch 504.

Figure 19:
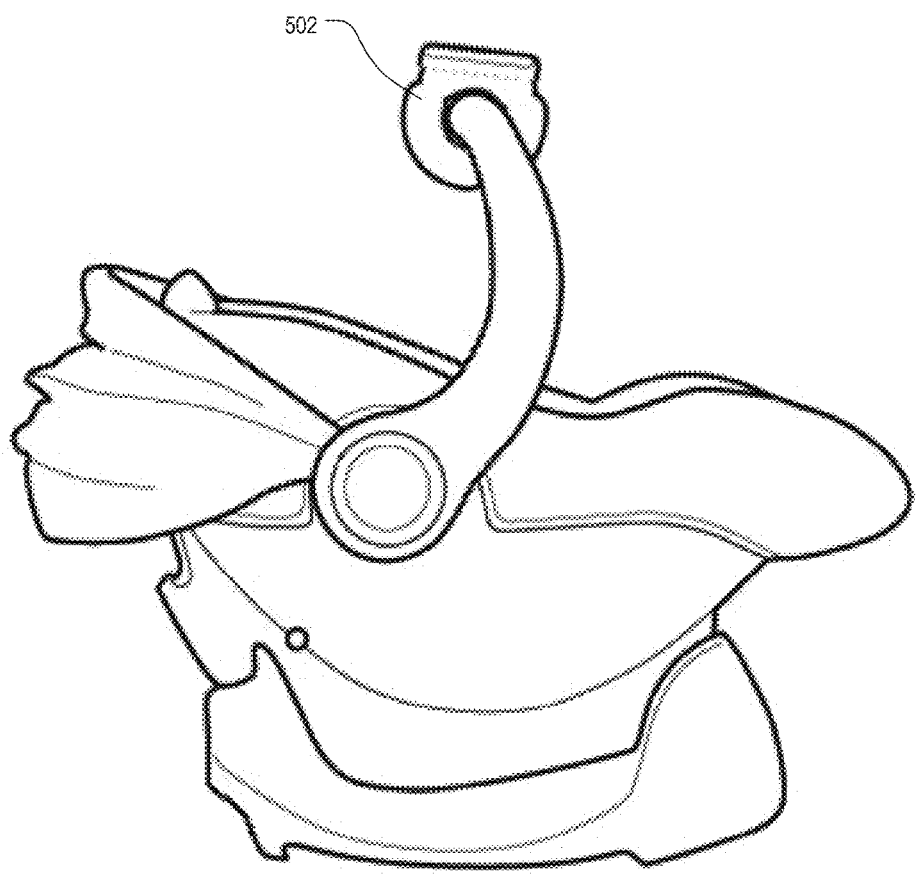
FIG. 19 is a side view of the infant car seat assembly having a removable handle pad secured thereto of FIG. 18.

FIG. 19 is a side view of the infant car seat assembly 2000 having a removable handle pad 502 in an upward facing position in accordance with a preferred embodiment of the present invention.

Figure 20:
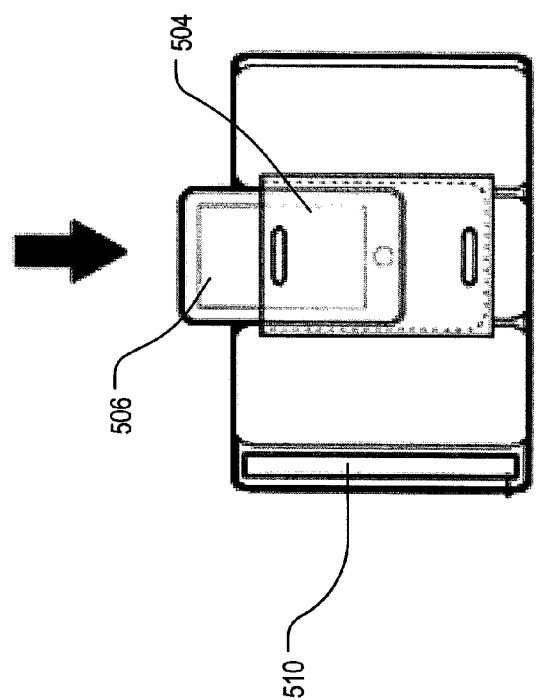
FIG. 20 illustrates the removable handle pad of FIG. 18.

FIG. 20 is a top view of the removable handle pad 502 with a smart phone 506 partially in smart phone pouch 504 in accordance with a preferred embodiment of the present invention. In the preferred embodiment, a smart phone is slide into the smart phone pouch 504. In other contemplated embodiments, the smart phone pouch 504 can snap closed to secure a smart phone. In a further contemplated embodiment, a smart phone is secured to removable handle pad 502 by other attachment means. In a preferred embodiment, pouch 504 is a see through poly pouch with speaker holes. As shown in FIG. 20, removable handle pad 502 has a Velcro strip 510 along one side of the removable handle pad 502 to secure the removable handle pad 502 to handle 406 of infant car seat assembly 100. In one contemplated embodiment, removable handle pad 502 can be secured by a clip. In one contemplated embodiment, removable handle pad 502 can be secured by a button. In one contemplated embodiment, removable handle pad 502 can be secured by a zipper. In another contemplated embodiment, removable handle pad 502 can be secured by other fastening means.

Figure 21:
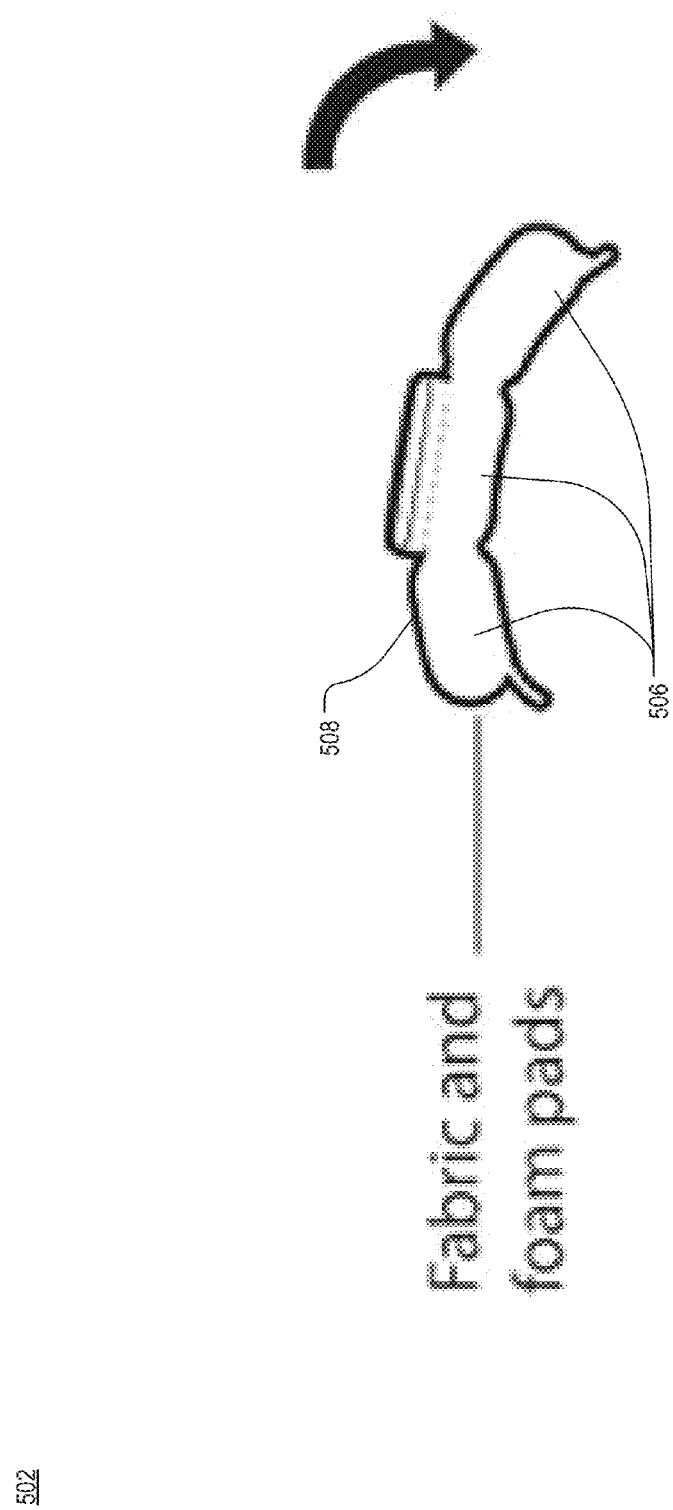
FIG. 21 is a side view of the removable handle pad of FIG. 18.

FIG. 21 is a side view of an unwrapped removable handle pad 502 in accordance with a preferred embodiment of the present invention. In the preferred embodiment, the removable handle pad 502 has foam pads 506 surrounded by fabric 508. In another contemplated embodiment, the removable handle pad 502 has another pad like material surrounded by fabric 508. In another contemplated embodiment, foam pads 506 are covered by various other materials. In one embodiment, the removable handle pad 502 has three foam pads 506 (as best seen in FIG. 21). In another embodiment, the removable handle pad 502 has two foam pads 506 (as best seen in FIG. 23).

Figure 22:
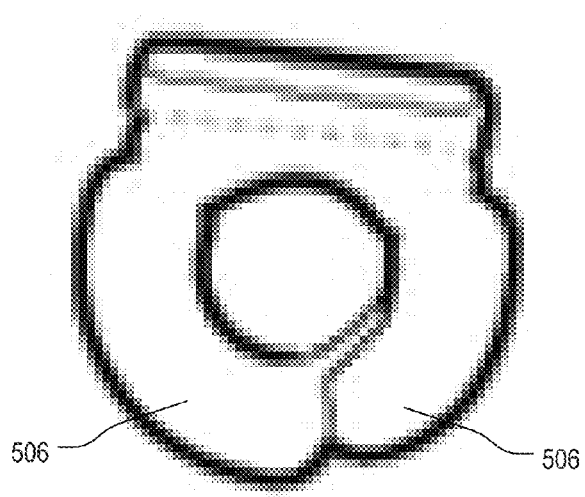
FIG. 22 is a side view of the removable handle pad of FIG. 18.

FIG. 22 is a side view of a wrapped handle pad 502 in accordance with a preferred embodiment of the present invention. As shown in FIG. 22, the foam pads 506 on either end of the removable handle pad 502 connect to secure removable handle pad 502 on infant car seat assembly 100.

Figure 23:
FIG. 23 is a top-perspective view of a removable handle pad in accordance with one or more embodiments of the present invention.

FIG. 23 is a top-perspective view of an unwrapped removable handle pad 602 in accordance with a preferred embodiment of the present invention. As shown in FIG. 23, the removable handle pad 602 may have two foam pads 506. The foam pads 506 connect together to secure removable handle pad 502 on the infant car seat assembly 100. In the preferred embodiment, a Velcro strip 510 extends along one side to secure the removable handle pad 502 to the handle 406 of the infant car seat assembly 100. In one contemplated embodiment, the foam pads 506 are memory foam to facilitate attachment to handle 406.

Figure 24:
FIG. 24 is a perspective view of the removable handle pad of FIG. 17.

FIG. 24 is a perspective illustration of the removable handle pad of FIG. 23 attached to the handle 406 of the infant car seat assembly 100. In the preferred, the removable handle pad 602 may rotate around handle 406 to allow an occupant of the infant car seat assembly 100 to view a smart phone contained in the removable handle pad 602.

Figure 25:
FIG. 25 is a perspective view of the removable handle pad of FIG. 24 rotated so that the pouch is on the bottom side of the handle.

FIG. 25 is a perspective illustration of the removable handle pad 602 of FIG. 24, positioned to allow an occupant of the infant car seat assembly 100 to view a smart phone contained in the removable handle pad 502 in accordance with a preferred embodiment of the present invention. In the preferred embodiment, the removable handle pad 502 may be rotated around handle 406 while attached.

Figure 26:
FIG. 26 is a perspective view of the removable handle pad of FIG. 24.

FIG. 26 is a rear-perspective illustration of the removable handle pad of FIG. 25 positioned to allow an occupant of the infant car seat assembly 100 to view a smart phone contained in the removable handle pad 602 in accordance with a preferred embodiment of the present invention.

What is claimed is:

1. A car seat assembly comprising:
   (a) a car seat comprising a crush barrier along at least one side of the seat;
   (b) a cup-holder formed in the crush barrier;
   (c) a controller for wirelessly accessing media, educational tools, and communication devices; and
   (d) wherein the plurality of controllers comprises at least one of a joy stick and a scroll ball, wherein each controller comprises a rounded cup configured base that is interchangeable to fit within the cup-holder.

2. The car seat assembly of claim 1, wherein the controller is further used to enable two-way wireless communication between the occupant seated in the car seat and another person.

3. The car seat assembly of claim 1, wherein car seat includes an arm to extend an electronic device.

* * * * *